United States Patent
Nochi et al.

(10) Patent No.: US 8,420,034 B2
(45) Date of Patent: Apr. 16, 2013

(54) METHOD AND APPARATUS FOR TREATING EXHAUST GAS

(75) Inventors: Katsumi Nochi, Hiroshima (JP); Yoshiaki Obayashi, Hiroshima (JP); Masashi Kiyosawa, Nagasaki (JP); Shintaro Honjo, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 160 days.

(21) Appl. No.: 12/670,871

(22) PCT Filed: Feb. 26, 2009

(86) PCT No.: PCT/JP2009/053575
§ 371 (c)(1),
(2), (4) Date: Apr. 28, 2010

(87) PCT Pub. No.: WO2009/107731
PCT Pub. Date: Sep. 3, 2009

(65) Prior Publication Data
US 2011/0162345 A1   Jul. 7, 2011

(30) Foreign Application Priority Data
Feb. 28, 2008 (JP) ................... 2008-047460

(51) Int. Cl.
*B01D 47/00* (2006.01)
*B01D 53/50* (2006.01)
*C01G 23/00* (2006.01)
*C01F 1/00* (2006.01)

(52) U.S. Cl.
USPC ........... 423/210; 423/81; 423/163; 423/240 R

(58) Field of Classification Search .......... None
See application file for complete search history.

(56) References Cited

U.S. PATENT DOCUMENTS

| | | | |
|---|---|---|---|
| 6,638,485 B1 | 10/2003 | Iida et al. | |
| 2003/0235525 A1* | 12/2003 | Honjo et al. | 423/210 |
| 2004/0253158 A1 | 12/2004 | Honjo et al. | |
| 2005/0232838 A1* | 10/2005 | Cichanowicz | 423/239.1 |
| 2006/0011115 A1 | 1/2006 | Breen et al. | |

(Continued)

FOREIGN PATENT DOCUMENTS

| | | |
|---|---|---|
| CN | 101098835 A | 1/2008 |
| EP | 0 860 197 A1 | 8/1998 |

(Continued)

OTHER PUBLICATIONS

International Search Report of PCT/JP2009/053575, mailing date of May 12, 2009.

(Continued)

*Primary Examiner* — Melvin C Mayes
*Assistant Examiner* — Sheng H Davis
(74) *Attorney, Agent, or Firm* — Westerman, Hattori, Daniels & Adrian, LLP

(57) ABSTRACT

In an exhaust gas treatment, the amount of a highly corrosive mercury-halogenating agent to be added is reduced with the mercury-removing efficiency maintained high.

A mercury-halogenating agent (40) and ammonia (30) are added to combustion exhaust gas from a boiler, the exhaust gas containing $NO_x$, $SO_x$ and mercury. The exhaust gas is brought into contact with a CO/HC oxidation catalyst (50) and is then subjected to reduction denitration (60) in the presence of a solid catalyst. Thereafter, metallic mercury is oxidized to halogenated mercury. Then, the exhaust gas is wet-desulfurized (100) with the alkaline absorbing solution, and the halogenated mercury is removed.

15 Claims, 3 Drawing Sheets

U.S. PATENT DOCUMENTS

| | | |
|---|---|---|
| 2006/0083671 A1 | 4/2006 | Obayashi et al. |
| 2006/0177367 A1* | 8/2006 | Li et al. .................. 423/239.1 |
| 2009/0004085 A1 | 1/2009 | Takeuchi et al. |

FOREIGN PATENT DOCUMENTS

| | | |
|---|---|---|
| EP | 1842836 A1 | 10/2007 |
| JP | 10-230137 A | 9/1998 |
| JP | 2003-305338 A | 10/2003 |
| JP | 2004-237244 A | 8/2004 |
| JP | 2006-136869 A | 6/2006 |
| JP | 2006-263700 A | 10/2006 |
| JP | 2007-215818 A | 8/2007 |

OTHER PUBLICATIONS

Chinese Office Action dated Sep. 5, 2012, issued in corresponding Chinese Patent Application No. 200980100661.9, (10 pages). With English Translation.

Japanese Office Action dated Jul. 13, 2012, issued in corresponding Japanese Patent Application No. 2008-047460, with English translation (4 pages).

European Search Report dated Jan. 19, 2012, issued in corresponding European Patent Application No. 09716136.8.

* cited by examiner

US 8,420,034 B2

METHOD AND APPARATUS FOR TREATING EXHAUST GAS

TECHNICAL FIELD

The present invention relates to a method and to an apparatus for treating exhaust gas by removing nitrogen oxide, sulfur oxide and mercury from exhaust gas discharged from a combustion apparatus such as a boiler.

BACKGROUND ART

Among methods for treating exhaust gas in which $NO_x$ is removed from exhaust gas in a reduction denitration unit and then $SO_2$ is removed in a wet desulfurization unit using an alkaline absorbing solution as an absorbent, there has been researched a method for treating metallic mercury and a mercury compound (hereinafter, collectively referred to as mercury, unless otherwise stated) in exhaust gas while performing denitration and desulfurization at the same time.

Mercury in flue gas exists in forms of metallic mercury which are insoluble in water, and mercury chloride which is soluble in water. When in the form of metallic mercury, mercury is difficult to dissolve in water. When mercury is in the metallic form, the efficiency of removing mercury by a wet desulfurization unit is decreased. Conversely, when mercury is in the form of $HgCl$ or $HgCl_2$, $HgCl$ or $HgCl_2$ in exhaust gas it may be dissolved in water through the gas-liquid contact in the wet desulfurization unit, and thereby mercury can be removed. In other words, if metallic mercury can be converted into mercury chloride in the presence of a catalyst such as a denitration catalyst, mercury can be removed in the desulfurization unit located downstream.

An example of such a conventional method for treating exhaust gas utilizing this scheme will be described with reference to FIG. 3. In FIG. 3, a $NH_3$ supply spot 20 and a supply spot 21 are provided in a flow path from a boiler 10 to a reduction denitration unit 60. At the $NH_3$ supply spot 20, $NH_3$ supplied from a $NH_3$ tank 30 is injected into exhaust gas. At the supply spot 21, a mercury-chlorinating agent such as HCl is injected into the exhaust gas from a tank 40 for supplying the mercury-chlorinating agent. The exhaust gas from the boiler 10 is introduced into the reduction denitration unit 60. In the reduction denitration unit 60, $NH_3$ and $NO_x$ in the exhaust gas into which $NH_3$ and HCl are injected react with each other, and simultaneously metallic Hg is oxidized to $HgCl_2$ in the presence of HCl. After passing through an air heater 70 and a heat collector 80, the soot and dust are removed in a dust collector 90. Then, $SO_2$ and $HgCl_2$ in the exhaust gas are simultaneously removed in a wet desulfurization unit 100. At this point, an excessive amount of HCl is contained in the exhaust gas having passed through the reduction denitration unit 60, but is never discharged from a stack, since HCl is absorbed by an alkaline aqueous solution such as lime milk in the desulfurization unit 100. Together with the above-described method, a system in which a chlorinating agent such as HCl is sprayed upstream of a denitration catalyst to oxidize (chlorinate) mercury on the catalyst, and then the mercury is removed in a wet desulfurization unit located downstream thereof (see, for example, Patent Literature 1) has been proposed.

Patent Literature 1: JP 10-230137 A

DISCLOSURE OF THE INVENTION

Problems to be Solved by the Invention

However, there is a problem in that the chlorination reaction of mercury contained in the exhaust gas which takes place on the denitration catalyst is inhibited by incompletely combusted components (CO, HC) of coal or the like. As the incompletely combusted components hinders the mercury chlorination reaction, a larger amount of the mercury-chlorinating agent needs to be added in order to chlorinate mercury contained in the exhaust gas. Particularly, in a case of a coal with a low Cl content, an excessive amount of a mercury-chlorinating agent such as HCl must be supplied into the exhaust gas so as to maintain the rate of conversion to mercury chloride. Moreover, in order to vaporize HCl, a high-temperature heat source, steam, or the like is needed. Furthermore, in addition to $NH_3$, which is considered hazardous in power plants, highly corrosive HCl is used, which induces material corrosion, thereby presenting problems of increased utility and storage costs.

Accordingly, an object of the present invention is to provide a method and an apparatus for treating exhaust gas which are capable of reducing the amount of a highly corrosive mercury-halogenating agent such as a mercury-chlorinating agent to be added in an exhaust gas treatment with the mercury-removing efficiency maintained high.

Means for Solving the Problems

In order to achieve the above-described object, according to the present invention, a method for treating combustion exhaust gas from a boiler which contains $NO_x$, $SO_x$ and mercury comprises the steps of: adding a mercury-halogenating agent and ammonia to the combustion exhaust gas; bringing the combustion exhaust gas which the mercury-halogenating agent and ammonia were added to into contact with a CO/HC oxidation catalyst; subjecting the combustion exhaust gas contacted with the CO/HC oxidation catalyst to reduction denitration in the presence of a solid catalyst, and oxidizing metallic mercury to halogenated mercury; and wet-desulfurizing the combustion exhaust gas subjected to the reduction denitration with an alkaline absorbing solution, and removing the halogenated mercury with the alkaline absorbing solution.

According to another aspect of the present invention, a method for treating combustion exhaust gas from a boiler which contains $NO_x$, $SO_x$, and mercury includes the steps of: bringing the combustion exhaust gas into contact with a CO/HC oxidation catalyst; adding a mercury-halogenating agent and ammonia to the combustion exhaust gas contacted with the CO/HC oxidation catalyst; subjecting the combustion exhaust gas, which the mercury-halogenating agent and ammonia have been added to, to reduction denitration simultaneously with oxidizing metallic mercury to halogenated mercury in the presence of a solid catalyst; and wet-desulfurizing the combustion exhaust gas subjected to the reduction denitration with an alkaline absorbing solution, and removing the halogenated mercury with the alkaline absorbing solution.

The method for treating exhaust gas preferably further includes a step of bringing the exhaust gas into contact with a $SO_3$ reduction catalyst after the addition of the mercury-chlorinating agent and ammonia but before the reduction denitration. Furthermore, the mercury-halogenating agent is preferably ammonium chloride or HCl. Moreover, it is preferable that the CO/HC oxidation catalyst is a catalyst comprising: at least one selected from the group consisting of $TiO_2$, $SiO_2$, $ZrO_2$, $Al_2O_3$ and zeolite as a support; and at least one selected from the group consisting of Pt, Ru, Rh, Pd, Ir, Au, Ag, V, W, Mo, Ni, Co, Fe, Cr, Cu and Mn as an active component, wherein the active component is supported on the support.

According to yet another aspect of the present invention, an apparatus for treating combustion exhaust gas containing $NO_x$, $SO_x$ and mercury comprises in sequence: a mercury-halogenating-agent injection unit for adding a mercury-halogenating agent to the combustion exhaust gas, and an ammonia injection unit for injecting ammonia into the combustion exhaust gas; a CO/HC oxidation catalyst for oxidizing an incompletely combusted component in the combustion exhaust gas; a reduction denitration unit for subjecting the combustion exhaust gas to reduction denitration in the presence of a solid catalyst; and a wet desulfurization unit for wet desulfurization with an alkaline absorbing solution.

According to still another aspect of the present invention, an apparatus for treating combustion exhaust gas containing $NO_x$, $SO_x$ and mercury comprises in sequence: a CO/HC oxidation catalyst for oxidizing an incompletely combusted component in the combustion exhaust gas; a mercury-halogenating-agent injection unit for adding a mercury-halogenating agent to the combustion exhaust gas, and an ammonia injection unit for injecting ammonia into the combustion exhaust gas; a reduction denitration unit for subjecting the combustion exhaust gas to reduction denitration in the presence of a solid catalyst; and a wet desulfurization unit for wet-desulfurizing reduction-denitrated combustion exhaust gas with an alkaline absorbing solution.

Effects of the Invention

According to a method for treating exhaust gas of the present invention, incompletely combusted components contained in the exhaust gas are removed with a CO/HC oxidation catalyst, and then the exhaust gas is subjected to reduction denitration in the presence of a solid catalyst. Thereby, inhibition of the mercury halogenation reaction by CO and HC can be avoided, and the mercury halogenation reaction can be efficiently carried out with a small amount of a mercury-halogenating agent. This makes it possible to reduce the amount of highly corrosive HCl used as the mercury-halogenating agent. Thus, the concern about flue corrosion can be lessened. Furthermore, it is made possible to suppress energy used for a heat source, steam, or the like needed to vaporize HCl.

EXPLANATION OF REFERENCE NUMBERALS

10  Boiler
  20  $NH_3$ supply spot
  21  Mercury-halogenating-agent supply spot
  30  $NH_3$ tank
  40  Mercury-halogenating-agent tank
  41  Flow-amount control valve
  43  Mercury-halogenating-agent supply-amount control unit
  44  Mercury-halogenating-agent monitor
  50  CO/HC oxidation catalyst
  60  Denitration catalyst
  70  Air heater

EXPLANATION OF REFERENCE NUMBERALS

80  Heat collector
  90  Dust collector
  100 Desulfurization unit
  110 Hg monitor
  120 Reheater
  130 Stack

BEST MODES FOR CARRYING OUT THE INVENTION

One embodiment of an apparatus for treating exhaust gas according to the present invention will be described with reference to the attached drawings. It should be noted that the present invention is not limited to embodiments described below.

Figure 1:
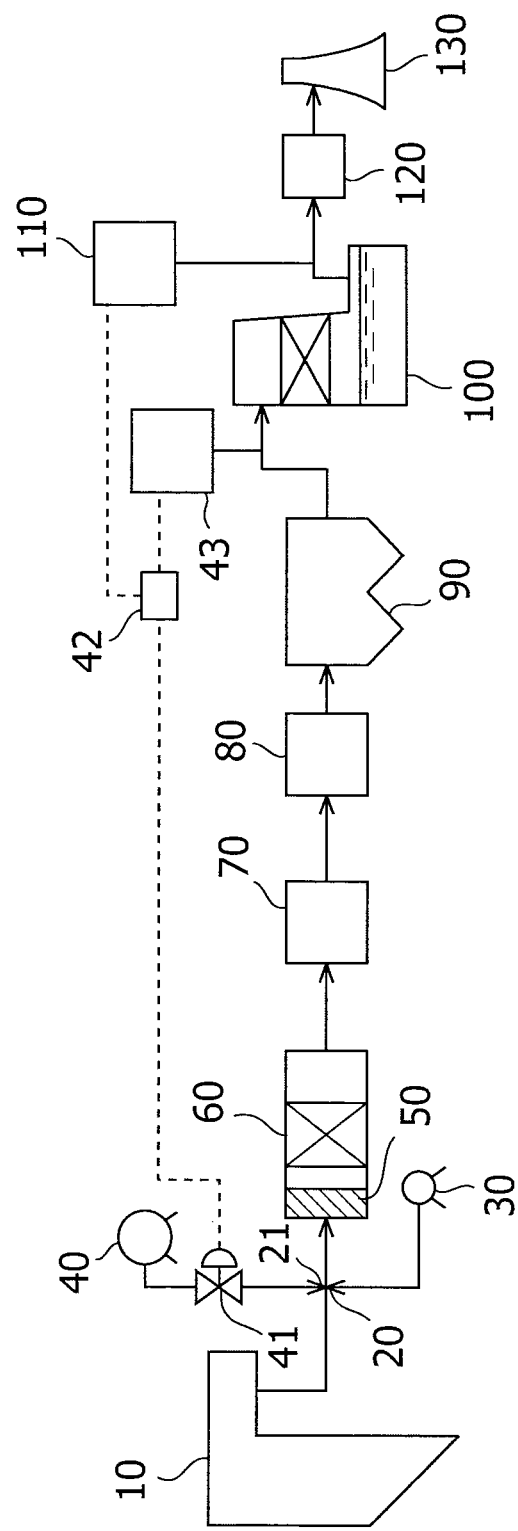
FIG. 1 is a schematic diagram showing one embodiment of an apparatus for treating exhaust gas according to the present invention.

FIG. 1 schematically shows one embodiment of the apparatus for treating exhaust gas. As shown in FIG. 1, the present apparatus comprises a boiler 10, a $NH_3$ supply spot 20 where $NH_3$ is injected, a mercury-halogenating-agent injection spot 21 where a mercury-halogenating agent is injected, a CO/HC oxidation catalyst 50, a denitration unit 60, an air heater 70, a heat collector 80, a dust collector 90, a desulfurization unit 100, a reheater 120, and a stack 130, which are sequentially provided in a flow path of exhaust gas. To the $NH_3$ supply spot 20, a $NH_3$ tank 30 is connected. To the mercury-halogenating-agent injection spot 21, a mercury-halogenating-agent tank 40 is connected. Between the mercury-halogenating-agent injection spot 21 and the mercury-halogenating-agent tank 40, a mercury-halogenating-agent flow-amount control valve 41 is provided which controls the flow amount of the mercury-halogenating agent. Between the dust collector 90 and the desulfurization unit 100, a mercury-halogenating-agent monitor is provided which detects the concentration of the mercury-halogenating agent in the gas. Between the desulfurization unit 100 and the reheater 120, an Hg monitor is provided which detects the concentration of Hg in the gas. A mercury-halogenating-agent supply-amount control unit is provided which receives detection data of the mercury-halogenating agent monitor and the Hg monitor and which transmits, to the flow-amount control valve 41, the amount of the mercury-halogenating agent to be supplied.

FIG. 1 shows that an exhaust gas to be treated in the present invention is an exhaust gas from the boiler 10 of thermal power plants, factories, or the like where fuels such as coal, heavy oil, and the like containing sulfur, mercury, and the like are combusted. Besides, the exhaust gas may be an exhaust gas from furnaces of metal factories, petroleum refineries, petrochemical factories, and the like. Preferably, the exhaust gas to be treated is an exhaust gas which has a low $NO_x$ concentration, contains carbon dioxide, oxygen, $SO_x$, dust or water, and is discharged in a large amount.

Ammonia is injected into the exhaust gas from the $NH_3$ tank 30 in a conventional way. As $NH_3$ injection means, one made of a $NH_3$ injection pipe and multiple spray nozzles is used. As the injection method, a method in which $NH_3$ is vaporized and diluted by adding air, inert gas, water vapor, or the like thereto, and is then injected, can be adopted. In this event, it is effective to arrange the nozzles so that the reducing agent can flow uniformly to the catalyst at the downstream side. In some cases, the multiple nozzles are arranged in a direction perpendicular to the gas flow.

An additive that produces a water-soluble metal compound is not limited only to the mercury-chlorinating agent. Other than chlorine-based agents, halogens such as bromine and bromine compounds such as HBr, $Br_2$, and $CaBr_2$ can be used. Thus, in the present invention, as the additive injected to oxidize mercury, bromine-based mercury-halogenating agents such as bromine, HBr, $Br_2$, and $CaBr_2$ can be used. Meanwhile, the mercury-halogenating agent in the mercury-halogenating-agent tank 40 refers to a chlorinating agent that produces $HgCl_2$ and/or HgCl when mercury in the exhaust gas reacts with the mercury-chlorinating agent in the presence of a catalyst. Examples thereof include HCl, ammonium chloride, chlorine, hypochlorous acid, ammonium hypochlorite, chlorous acid, ammonium chlorite, chloric acid, ammonium chlorate, perchloric acid, ammonium perchlorate, and amine salts or other salts of the above-described acids.

The amount of the mercury-halogenating agent added into the exhaust gas may be a stoichiometric amount of poorly water-soluble mercury such as metallic mercury or slightly more than that amount. In a case in which coal or heavy oil is used as the fuel, the concentration of the mercury-halogenating agent added into the exhaust gas is 1000 ppm or less for the exhaust gas, and is actually approximately 10 to 500 ppm.

As a chemical agent for the addition when HCl is used as the mercury-halogenating agent, hydrogen chloride or hydrochloric acid may be used. The concentration of hydrochloric acid is not particularly limited. For example, concentrated hydrochloric acid to approximately 5% diluted hydrochloric acid can be exemplified. As a unit for adding HCl to the exhaust gas, a conventionally-available metering pump for liquid chemicals may be used. Alternatively, HCl may be atomized in a way that HCl is sprayed or vaporized by using a spray grid or a vaporizer. Meanwhile, when salts such as ammonium chloride are added, it is preferable to use an aqueous solution of the salt. Note that, in the case of a compound that evaporates (or may sublimate) in the exhaust gas, a compound which is in a solid state can be used. Incidentally, the mercury-halogenating agent may be added before or after ammonia is added to the exhaust gas.

As the CO/HC oxidation catalyst 50, a $NH_3$ decomposition catalyst that is conventionally used (JP-A 2004-237244) can be employed. Specifically, examples of the CO/HC oxidation catalyst 50 include catalysts in which at least one selected from the group consisting of Pt, Ru, Rh, Pd, Ir, V, W, Mo, Ni, Co, Fe, Cr, Cu and Mn as an active component is supported on at least one selected from the group consisting of $TiO_2$, $SiO_2$, $ZrO_2$, $Al_2O_3$ and zeolite as a support. Here, from the viewpoint of durability to sulfur oxide contained in the exhaust gas, titanium oxide or silicon oxide is particularly preferably used as the support. Preferable activities are obtained from catalysts in which oxides of noble metals such as Pt, Ru, Pd and Ir, vanadium, tungsten, molybdenum, or the like as the active metal species are supported on complex oxides containing $TiO_2$ or $SiO_2$ as the support.

In the present invention, in order to increase the specific surface area and solid acid amount of the CO/HC oxidation catalyst, Ti oxide in the form of a complex oxide can be used as the support. Examples of a metal forming the Ti complex oxide include silicon (Si), zirconium (Zr), aluminium (Al), and tungsten (W). Complex oxides of, for example, Ti and Si, Ti and Zr, Ti and Al, and Ti and W can be used. Since all of these complex oxides are less likely to form sulfate, the stable structure can be maintained. Thus, the specific surface area and the solid acid amount can be increased. Moreover, as necessary, complex oxides of a three-component system such as Ti and Si+ Zr, Ti and Si+ W, Ti and Si+Al, Ti and Zr+Al, and Ti and Zr+W can be used. In the CO/HC oxidation catalyst of the present invention, at least one selected from the group consisting of Pt, Ru, Rh, Pd, Ir, V, W, Mo, Ni, Co, Fe, Cr, Cu and Mn can be used as the active component supported on the support described above.

The composition ratio of the catalyst used in the present invention is not particularly limited. As one preferable example, when the active component is an oxide of base metal elements such as V, W, Mo, Ni, Co, Fe, Cr, Cu and Mn, the composition of the active component is 0.5 to 20 parts by weight relative to 100 parts by weight of a support consisting of one kind of the oxide or complex oxide; alternatively, when the active component is a noble metal element such as Pt, Ru, Rh, Pd, Ir, Au and Ag, the composition of the metal is preferably 0.01 to 2 parts by weight. More specifically, relative to 100 parts by weight of a $TiO_2$ support, a composition with the active component of 0.02 parts by weight of Pt can be used (JP 2004-237244 A). Alternatively, a dual function catalyst described in Japanese Patent Application No. 2007-215818 can be used in place of the $NH_3$ decomposition catalyst.

Moreover, any shape of the CO/HC oxidation catalyst 50 can be selected in accordance with the system configuration. Any integrally molded shape such as a pellet shape, plate shape, cylindrical shape, corrugated shape, and honeycomb shape can be adopted, for example.

As a solid catalyst used in the denitration unit 60, one obtained by, for example, a catalyst in which metal oxides such as V, W and Mo are supported on a support such as titania, silica, zirconia, complex oxides of these, and/or zeolite can be used. Moreover, as the solid catalyst, a honeycomb-shaped catalyst, one formed by layering such catalysts, one formed by packing granular catalysts, or the like is used.

The desulfurization unit 100 may be a type generally used in a flue gas treatment such as a wet desulfurization unit or a desulfurization unit in which a cooling tower is provided upstream of an absorption tower. Thus, the desulfurization unit 100 is not particularly limited, and a generally available wet desulfurization unit can be used. Examples of the absorbing solution used in wet desulfurization include aqueous solutions of absorbents (alkaline absorbing solution) such as calcium carbonate, calcium oxide, calcium hydroxide, sodium carbonate, and caustic soda.

The heat collector 80 and the reheater 120 are each constituted of a gas heater having a system in which heat energy is exchanged with a heat medium being used as a medium of the gas heater. Here, it is only necessary that the heat collector 80 and the reheater 120 each decrease or increase the temperature of the exhaust gas. The heat collector 80 and the reheater 120 may be separate systems, or gas-gas heaters that directly exchange heat.

According to the above-described configuration, first, $NH_3$ and a mercury-halogenating agent, for example, HCl respectively from the $NH_3$ tank 30 and the mercury-halogenating-agent tank 40 are supplied into exhaust gas from the boiler 10. Then, the exhaust gas is introduced into the unit including the CO and a HC oxidation catalyst, and incompletely combusted components, CO and HC, in the exhaust gas are oxidized. Examples of the oxidation reaction are shown below. Note that HC in the exhaust gas exists in the state of HCHO, $C_2H_4$ or $C_6H_6$, for example.

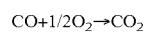

$$CO+1/2O_2 \rightarrow CO_2$$

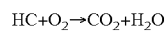

$$HC+O_2 \rightarrow CO_2+H_2O$$

The exhaust gas with the incompletely combusted components being oxidized is introduced into the denitration unit 60. In the denitration unit 60, $NH_3$ reacts with $NO_x$, and simulta neously metallic Hg is oxidized to $HgCl_2$ in the presence of HCl. Examples of these reactions are shown below.

$$4NO+4NH_3+O_2 \rightarrow 4N_2+6H_2O$$

$$Hg+2HCl+1/2O_2 \rightarrow HgCl_2+H_2O$$

At this point, CO and HC contained in the exhaust gas inhibit the mercury oxidation reaction.

$$HgCl_2+CO+H_2O \rightarrow Hg+2HCl+CO_2$$

$$HgCl_2+HC+H_2O+O_2 \rightarrow Hg+2HCl+CO_2$$

However, in the present invention, CO and HC in the exhaust gas are removed by the oxidation catalyst in advance. Thus, inhibition of the mercury oxidation reaction in the denitration unit 60 can be suppressed. Thereafter, the exhaust gas passes through the air heater 70, the heat collector 80 and the dust collector 90, and the soot and dust are removed. The exhaust gas with the soot and dust being removed therefrom is introduced into the desulfurization unit 100, and $SO_2$ as well as $HgCl_2$ are simultaneously removed. The exhaust gas treated with the desulfurization unit 100 is released to the air from the stack 130. In the reheater 120, the combustion exhaust gas whose temperature has been decreased is heated by heat energy collected by the heat collector 80 located upstream of the desulfurization unit 100. When the combustion exhaust gas is released, the gas is purified and then heated to be turned into high-temperature gas. Thereafter, the gas is discharged.

As described above, according to one embodiment of the present invention, the CO/HC oxidation catalyst 50 is provided upstream of the denitration catalyst 60. Thereby, inhibition of the mercury oxidation reaction with the denitration catalyst caused by the incompletely combusted components (CO, HC) of coal or the like can be avoided. As a result, the mercury oxidation reaction by the mercury-halogenating agent can be efficiently promoted.

In a conventional apparatus for treating exhaust gas, exhaust gas entering the denitration unit contains an excessive amount of mercury-halogenating agent for oxidizing mercury, which is added by an HCl/HBr spray unit, a $NH_4Cl$ supply unit, or the like. In particular, a large amount of a mercury-halogenating agent must be added to exhaust gas with a low Cl content. For this reason, there has been a concern that highly corrosive HCl may corrode the flue. However, according to the one embodiment of the present invention, the amount of a mercury-halogenating agent added to oxidize mercury contained in the exhaust gas can be suppressed to be an extremely small amount. As a result, the concern about the corrosion of the flue by highly corrosive HCl can be ameliorated. Furthermore, it is possible to reduce the amount of HCl added as the mercury-halogenating agent as well as the utility cost for a high-temperature heat source, steam, or the like to vaporize HCl.

Figure 2:
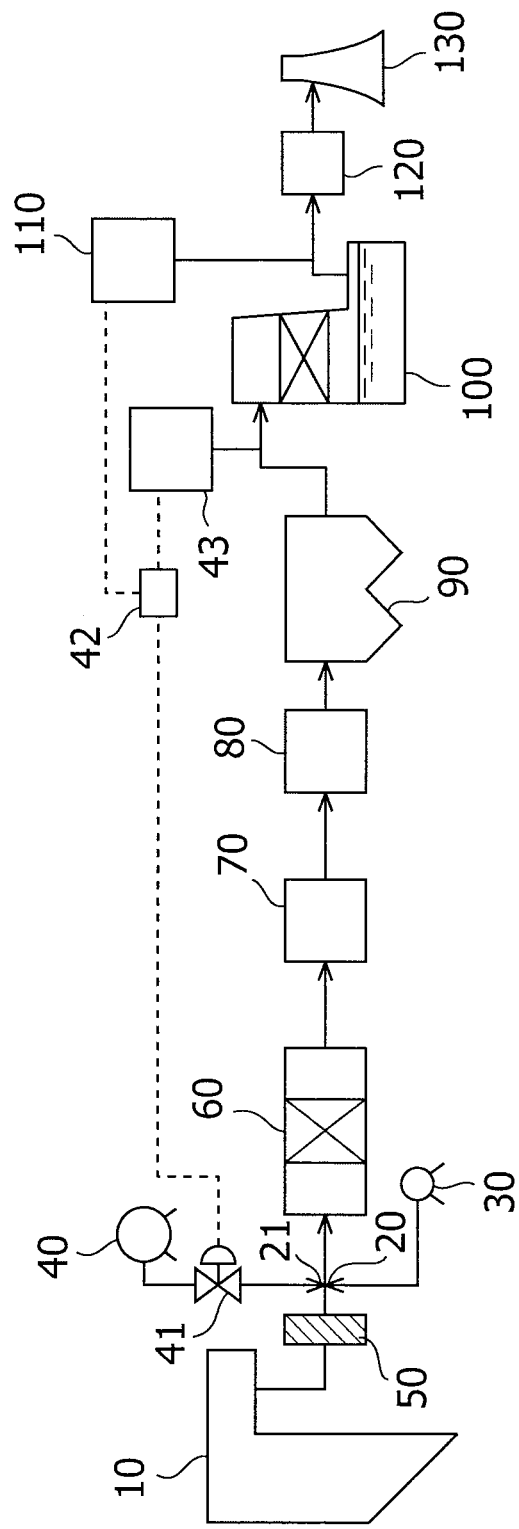
FIG. 2 is a schematic diagram showing another embodiment of the apparatus for treating exhaust gas according to the present invention.
Figure 3:
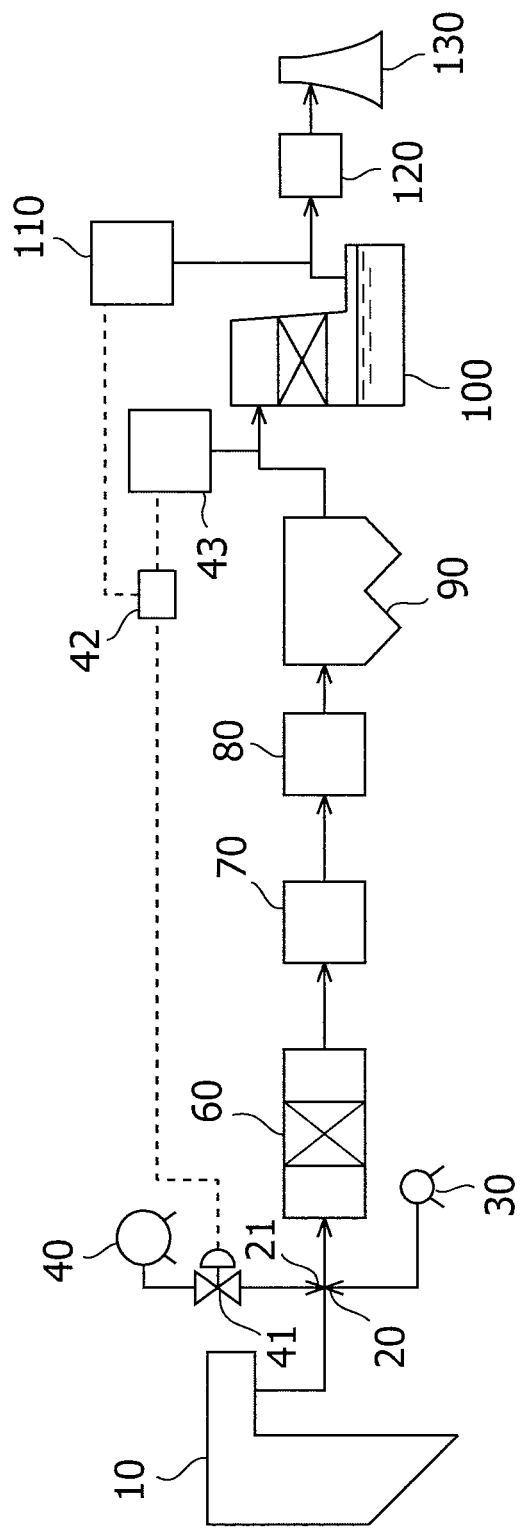
FIG. 3 is a schematic diagram showing an example of a conventional apparatus for treating exhaust gas.

In addition, another embodiment of the present invention will be described. FIG. 2 shows this embodiment. The same constituents as those in FIG. 1 are denoted by the same reference numerals, and the description thereof will be omitted. As shown in FIG. 2, in this embodiment, the CO/HC oxidation catalyst 50 is provided upstream of the denitration unit 60 and before the $NH_3$ and the mercury-halogenating-agent supply spots 20, 21.

According to this configuration, incompletely combusted components in the exhaust gas discharged from the boiler 10 can be oxidized with the CO/HC oxidation catalyst 50 without being influenced from $NH_3$ and a mercury-halogenating agent, for example, HCl, which are subsequently supplied.

Thus, the exhaust gas containing $NH_3$ and HCl which are subsequently supplied can be efficiently subjected to the oxidation reaction of mercury contained in the exhaust gas with the denitration catalyst. Thereafter, the exhaust gas passes through the air heater 70 and the heat collector 80, and the soot and dust are removed by the dust collector 90. After that, $SO_2$ and $HgCl_2$ in the exhaust gas are simultaneously removed in the wet desulfurization unit 100 in the same way as in the embodiment in FIG. 1.

Note that, in the other embodiment of the present invention, there is a concern that the amount of $SO_3$ in the exhaust gas increases. This is because of the arrangement of the CO/HC oxidation catalyst 50, which relatively increases the following reaction.

$$SO_2+1/2O_2 \rightarrow SO_3$$

For this reason, although not shown in FIG. 2, a conventionally-used $SO_3$ reduction catalyst can be provided between the $NH_3$ and mercury-halogenating-agent supply spots 20, 21 and the denitration catalyst 60. Thereby, after the oxidation treatment on CO and HC, without increasing the amount of $SO_3$ in the exhaust gas, the oxidation reaction of mercury contained in the exhaust-gas flow can be promoted on the denitration catalyst. Meanwhile, since the $SO_3$ reduction catalyst can oxidize CO and HC, a catalyst having a $SO_3$ reduction function can be used as the CO/HC oxidation catalyst 50 in FIG. 1. An example thereof includes a catalyst shown in JP 2006-136869 A.

Example

A test was carried out for the mercury oxidation activity when the different concentrations of CO and HC (benzene) were added as shown in Tables 2 and 3 based on the test conditions in Table 1.

TABLE 1

| temperature | ° C. | 400 |
| Ugs | mN/S | 1.20 |
| $NH_3$/NO | — | 0.9 |
| AV | $m^3N/m^2hr$ | 5.7 |
| $O_2$ | % | 4.0 |
| $H_2O$ | % | 11.0 |
| Hg | $\mu g/m^3N$ | 20 |
| HCl | ppm | 75 |
| $SO_x$ | ppm | 1000 |
| $NO_x$ | ppm | 350 |

TABLE 2

| condition | CO [ppm] | Mercury Oxidation rate [%] |
|---|---|---|
| 1 | 0 | 95.5 |
| 2 | 100 | 92.0 |
| 3 | 500 | 77.0 |

TABLE 3

| condition | $C_6H_6$ [ppm] | Mercury Oxidation rate [%] |
|---|---|---|
| 1 | 0 | 95.5 |
| 4 | 5 | 80.0 |

In this test for the mercury oxidation activity, honeycomb-shaped solid catalysts (each with 6 holes×7 holes, 500 mm long) were provided at three stages, and exhaust gas samples having compositions of $O_2$ to $NO_x$ described in Table 1 were allowed to flow therethrough under the conditions in Tables 1 to 3. Note that, in the table, Ugs means superficial velocity, and AV means the amount of gas to be treated based on gas-contact area.

When CO was 0 ppm (Condition 1), the mercury oxidation rate was 95.5%, whereas, when CO was 100 ppm (Condition 2), the mercury oxidation rate was lowered to 92.0%. When CO was 500 ppm (Condition 3), the oxidation rate was further lowered to 77.0%. Meanwhile, when 5 ppm of benzene ($C_6H_6$) was added as an example of HC (Condition 4), the mercury oxidation rate was lowered to 80.0%.

Accordingly, it was found that, in a system in which the CO/HC oxidation catalyst is arranged upstream of the denitration catalyst to reduce the amount of CO and HC that reach the denitration catalyst, the denitration catalyst is capable of maintaining a highly efficient mercury oxidation rate, and the excessive supply of HCl to increase the mercury oxidation rate can be avoided.

The invention claimed is:

1. A method for treating combustion exhaust gas from a boiler which contains NOx, SOx and mercury, comprising the steps of:
   adding a mercury-halogenating agent and ammonia to the combustion exhaust gas;
   bringing the combustion exhaust gas which the mercury-halogenating agent and ammonia were added to into contact with a CO/HC oxidation catalyst resulting in incompletely combusted components, CO and HC, in the combustion exhaust gas being oxidized;
   subjecting the combustion exhaust gas contacted with the CO/HC oxidation catalyst to reduction denitration simultaneously with oxidizing metallic mercury to halogenated mercury in presence of a solid catalyst; and
   wet-desulfurizing the combustion exhaust gas subjected to the reduction denitration with an alkaline absorbing solution, and removing the halogenated mercury with the alkaline absorbing solution.

2. The method for treating exhaust gas according to claim 1, further comprising, after the addition of the mercury-halogenating agent and ammonia but before the reduction denitration, a step of bringing the exhaust gas into contact with a CO/HC oxidation catalyst having a $SO_3$ reduction function.

3. The method for treating exhaust gas according to claim 2, wherein the mercury-halogenating agent is any one of ammonium chloride, HCl, and $Cl_2$.

4. The method for treating exhaust gas according to claim 2, wherein the CO/HC oxidation catalyst is a catalyst comprising:
   at least one selected from the group consisting of $TiO_2$, $SiO_2$, $ZrO_2$, $Al_2O_3$ and zeolite as a support; and
   at least one selected from the group consisting of Pt, Ru, Rh, Pd, Ir, Au, Ag, V, W, Mo, Ni, Co, Fe, Cr, Cu and Mn as an active component, wherein the active component is supported on the support.

5. The method for treating exhaust gas according to claim 1, wherein the mercury-halogenating agent is any one of ammonium chloride, HCl, and $Cl_2$.

6. The method for treating exhaust gas according to claim 5, wherein the CO/HC oxidation catalyst is a catalyst comprising:
   at least one selected from the group consisting of $TiO_2$, $SiO_2$, $ZrO_2$, $Al_2O_3$ and zeolite as a support; and
   at least one selected from the group consisting of Pt, Ru, Rh, Pd, Ir, Au, Ag, V, W, Mo, Ni, Co, Fe, Cr, Cu and Mn as an active component, wherein the active component is supported on the support.

7. The method for treating exhaust gas according to claim 1, wherein the CO/HC oxidation catalyst is a catalyst comprising:
   at least one selected from the group consisting of $TiO_2$, $SiO_2$, $ZrO_2$, $Al_2O_3$ and zeolite as a support; and
   at least one selected from the group consisting of Pt, Ru, Rh, Pd, Ir, Au, Ag, V, W, Mo, Ni, Co, Fe, Cr, Cu and Mn as an active component, wherein the active component is supported on the support.

8. A method for treating combustion exhaust gas from a boiler which contains NOx, SOx, and mercury, comprising the steps of:
   bringing the combustion exhaust gas into contact with a CO/HC oxidation catalyst resulting in incompletely combusted components, CO and HC, in the combustion exhaust gas being oxidized;
   adding a mercury-halogenating agent and ammonia to the combustion exhaust gas contacted with the CO/HC oxidation catalyst;
   subjecting the combustion exhaust gas which the mercury-halogenating agent and ammonia were added to reduction denitration simultaneously with oxidizing metallic mercury to halogenated mercury in the presence of a solid catalyst; and
   wet-desulfurizing the combustion exhaust gas subjected to the reduction denitration with an alkaline absorbing solution, and removing the halogenated mercury with the alkaline absorbing solution.

9. The method for treating exhaust gas according to claim 8, further comprising, after the addition of the mercury-halogenating agent and ammonia but before the reduction denitration, a step of bringing the exhaust gas into contact with a CO/HC oxidation catalyst having a $SO_3$ reduction function.

10. The method for treating exhaust gas according to claim 9, wherein the mercury-halogenating agent is any one of ammonium chloride, HCl, and $Cl_2$.

11. The method for treating exhaust gas according to claim 9, wherein the CO/HC oxidation catalyst is a catalyst comprising:
    at least one selected from the group consisting of $TiO_2$, $SiO_2$, $ZrO_2$, $Al_2O_3$ and zeolite as a support; and
    at least one selected from the group consisting of Pt, Ru, Rh, Pd, Ir, Au, Ag, V, W, Mo, Ni, Co, Fe, Cr, Cu and Mn as an active component, wherein the active component is supported on the support.

12. The method for treating exhaust gas according to claim 8, wherein the mercury-halogenating agent is any one of ammonium chloride, HCl, and $Cl_2$.

13. The method for treating exhaust gas according to claim 8, wherein the CO/HC oxidation catalyst is a catalyst comprising:
    at least one selected from the group consisting of $TiO_2$, $SiO_2$, $ZrO_2$, $Al_2O_3$ and zeolite as a support; and
    at least one selected from the group consisting of Pt, Ru, Rh, Pd, Ir, Au, Ag, V, W, Mo, Ni, Co, Fe, Cr, Cu and Mn as an active component, wherein the active component is supported on the support.

14. An apparatus for treating combustion exhaust gas containing NOx, SOx and mercury, comprising in sequence:
    a mercury-halogenating-agent injection unit including a tank containing mercury-halogenating-agent for adding a mercury-halogenating agent to the combustion exhaust gas, and an ammonia injection unit including a tank containing ammonia for injecting ammonia into the combustion exhaust gas;

a CO/HC oxidation catalyst for oxidizing an incompletely combusted component in the combustion exhaust gas;

a reduction denitration unit including a solid catalyst for subjecting the combustion exhaust gas to reduction denitration in the presence of the solid catalyst; and a wet desulfurization unit including alkaline absorbing solution for wet desulfurization with the alkaline absorbing solution.

15. An apparatus for treating combustion exhaust gas containing NOx, SOx and mercury, comprising in sequence:

a CO/HC oxidation catalyst for oxidizing an incompletely combusted component in the combustion exhaust gas;

a mercury-halogenating-agent injection unit including a tank containing mercury-halogenating agent for adding a mercury-halogenating agent to the combustion exhaust gas, and an ammonia injection unit including a tank containing ammonia for injecting ammonia into the combustion exhaust gas;

a reduction denitration unit including a solid catalyst for subjecting the combustion exhaust gas to reduction denitration in the presence of a solid catalyst; and a wet desulfurization unit including alkaline absorbing solution for wet desulfurization with an alkaline absorbing solution.

* * * * *